June 21, 1960 R. WELLS 2,941,655
DRYING APPARATUS
Filed June 7, 1957 3 Sheets-Sheet 2
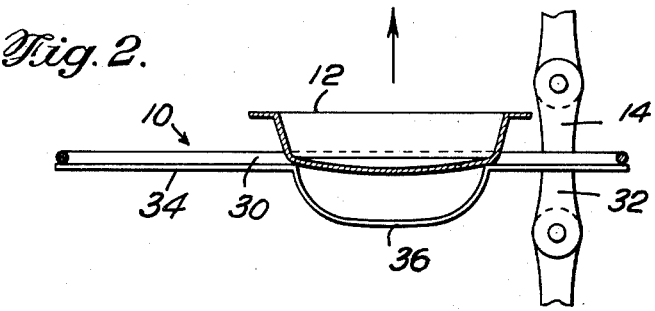
Fig. 2.
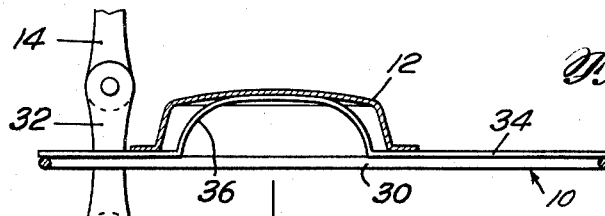
Fig. 3.
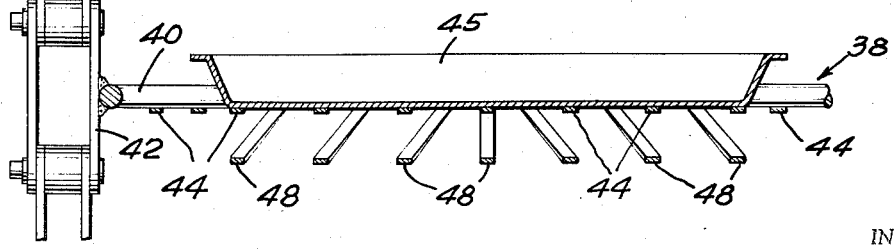
Fig. 5.
Fig. 6.
INVENTOR
Roger Wells,
BY Karl W. Flocks
ATTORNEY

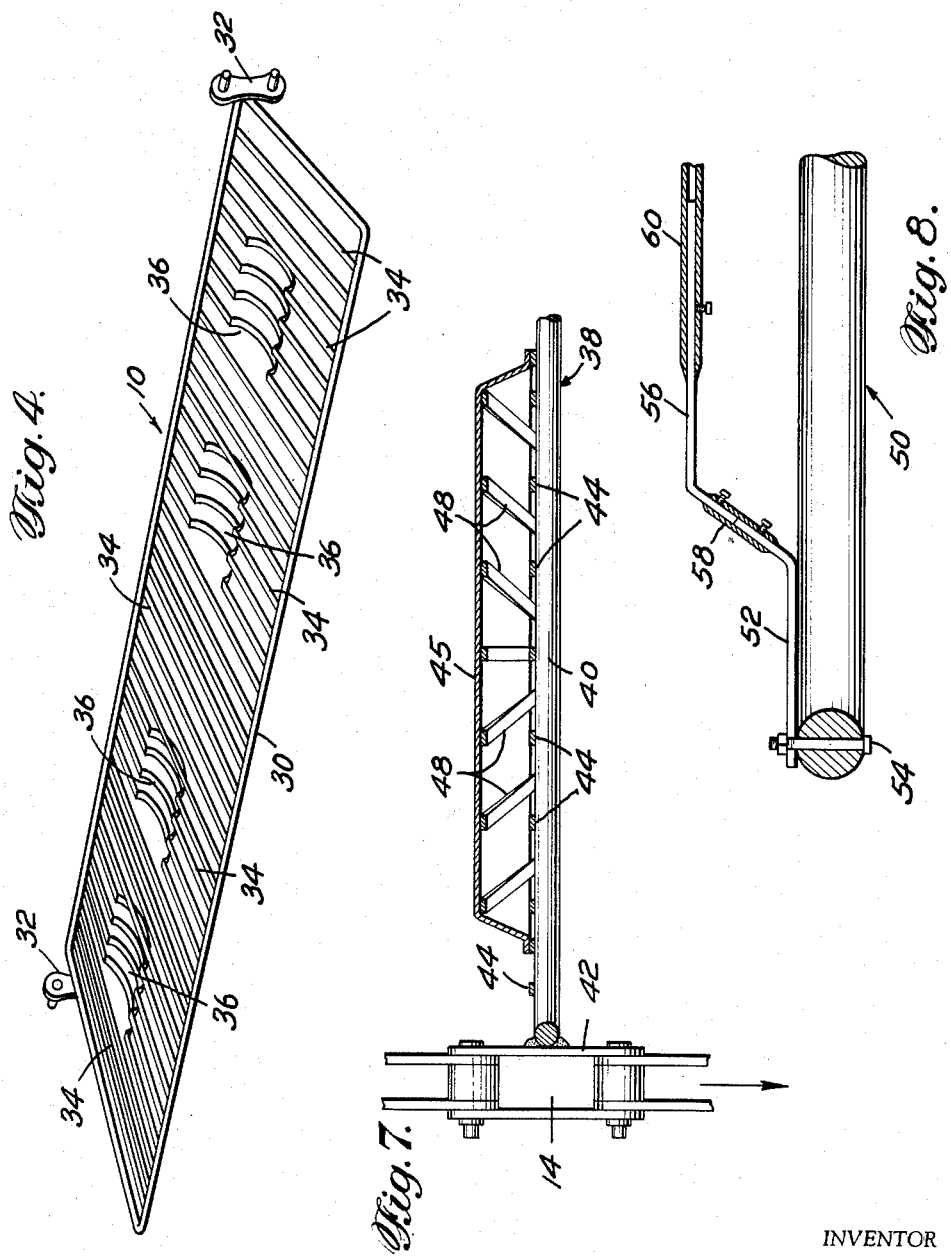

United States Patent Office 2,941,655
Patented June 21, 1960

2,941,655

DRYING APPARATUS

Roger Wells, Stamford, Conn., assignor to Diamond National Corporation, a corporation of Delaware Filed June 7, 1957, Ser. No. 664,278

7 Claims. (Cl. 198—131)

This invention relates to drying apparatus, and more particularly to apparatus for drying molded pulp articles.

In the customary commercial process of manufacturing molded pulp articles, such as plates and other shallow containers, a series of foraminous molds mounted on a rotary carrier and connected internally to a source of suction are advanced successively through a vat containing a water slurry of pulp fibers, from which the fibers are sucked onto the molds to form initially molded articles known as preforms. As the successive molds emerge from the pulp slurry and are advanced upwardly above the vat thereof, the suction applied to the molds is continued to extract some of the excess moisture from the wet preforms thereon. The successive preforms are then transferred to a heated drying chamber where substantially all of the remaining moisture is removed from the preforms. At the time the wet preforms are transferred to the drying chamber their moisture content may range from about 50% to about 70% by weight, and the drying treatment reduces this moisture content down to about 8%.

The drying chamber employed may be a vertical housing in which an endless conveyor carries a plurality of flat drying trays along parallel, elongated up and down courses. The wet molded pulp articles to be dried are placed on the drying trays at the bottom of the up course of the conveyor. From this point, the articles are successively advanced upwardly to the top of the conveyor, which is the midpoint of their path through the drying chamber, and then the articles are advanced downwardly to the bottom of the down course thereof. As each article passes from the up course to the down course at the top of the conveyor, the article is automatically inverted and also is moved to the preceding tray on the conveyor. For example, in the case of a shallow molded pulp container, such as a circular pie plate or a generally rectangular food tray, the container may be allowed to rest on its bottom portion on one of the drying drays as it advances along the up course of the conveyor, but as the trays advance around the turning point from the up course to the down course at the top of the conveyor, the container is flopped over onto the tray which had been above it on the up course, and the inverted container rests on the peripheral edges of its top portion while it moves along the down course.

The above-described apparatus is comparatively simple and economical to construct and operate. One of its outstanding advantages is the saving in the area of manufacturing floor space required. However, considerable difficulty may be experienced with warpage of pulp articles dried thereon, unless proper precautions are taken in accordance with the present invention.

An object of the present invention is to provide new and improved drying apparatus.

Another object of the invention is to provide new and improved apparatus for drying molded pulp containers.

Still another object of the invention is to eliminate undesirable warpage in molded pulp containers during drying thereof.

Yet another important object of the invention is to provide new and improved drying trays for use on endless conveyors in vertical drying chambers.

Other objects and the nature and advantages of the instant invention will be apparent from the following description taken in conjunction with the accompanying drawings, wherein:

Fig. 2 is an enlarged side elevational view of one of the drying trays on the up course of the conveyor shown in Fig. 1;

Fig. 3 is an enlarged side elevational view of one of the drying trays on the down course of the conveyor shown in Fig. 1;

Fig. 4 is a perspective view of a drying tray embodying the invention;

Fig. 5 is a plan elevational view of a drying tray forming a second embodiment of the invention;

Fig. 6 is an enlarged longitudinal vertical section of a drying tray forming a third embodiment, showing the tray as it would appear on the up course of a conveyor;

Fig. 7 is another vertical sectional view of the tray shown in Figs. 5 and 6, but showing the tray as it would appear on the down course of the conveyor; and Fig. 8 is a fragmentary vertical section of a drying tray representing a modified form of the invention.

Figure 1:
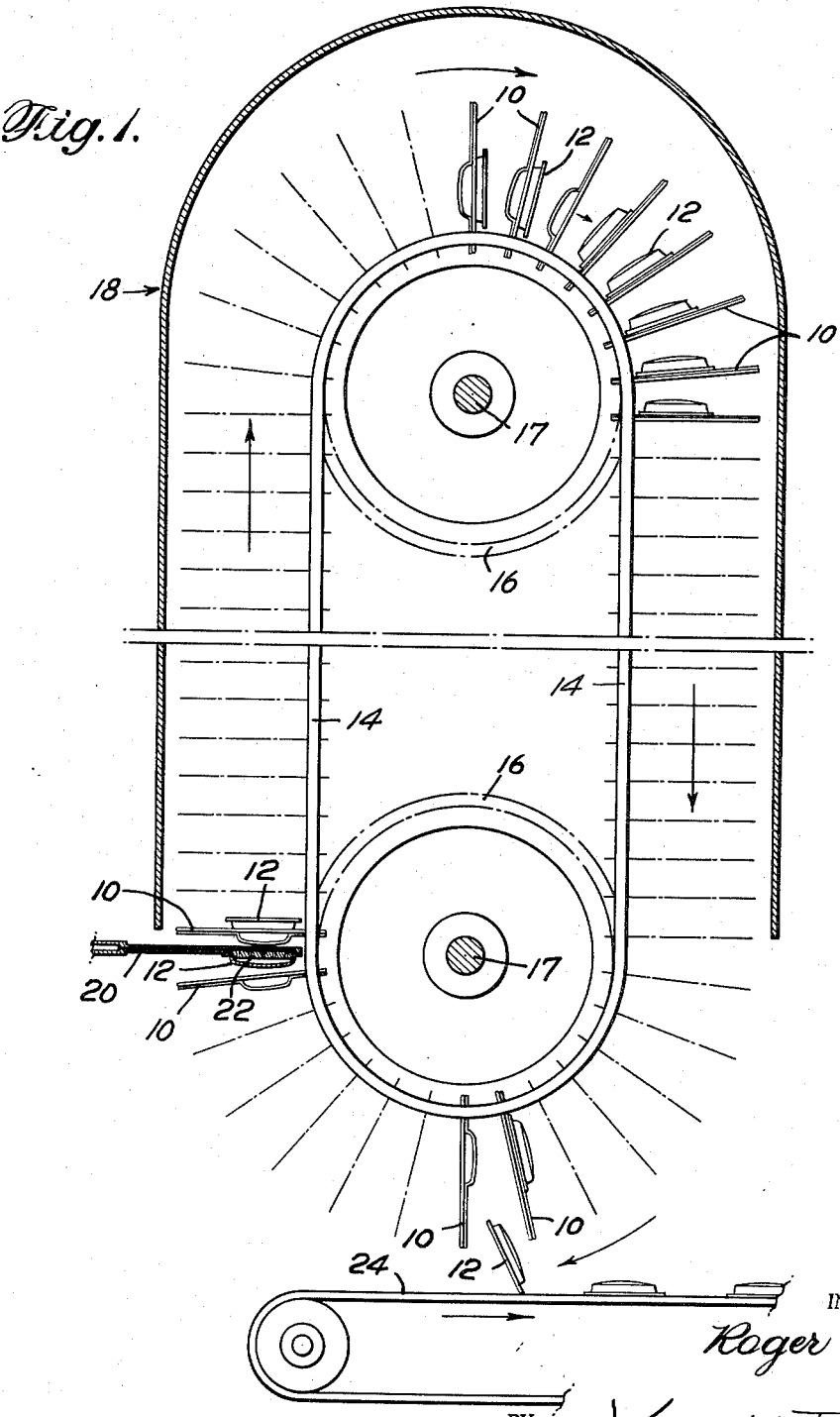
Fig. 1 is a side elevational view of drying apparatus embodying the invention, including a plurality of drying trays mounted on an endless conveyor within a chamber, with the housing of the chamber shown in section to reveal its interior.

Referring now to Fig. 1, the drying apparatus illustrated includes a plurality of drying trays 10 designed to support shallow molded pulp containers 12. Each of the trays 10 may support one or more of the containers 12, but as a practical matter each of the trays 10 is designed to support four of these containers, which is the number produced on one face of the rotary pulp molding machine employed (not shown). The trays 10 are secured at opposite sides thereof at equal intervals along a pair of parallel endless conveyor chains 14 of which only one chain 14 appears in Fig. 1. When the containers 12 are molded about one inch deep, the trays 10 may be located about three inches apart along the chains 14. Of course, it is understood that instead of the chains 14, any other suitable endless conveyor structure, such as belts, cables, or the like, may be employed. The chains 14 are disposed in parallel, elongated, up and down courses extending around pairs of vertically spaced sprockets 16 which are secured at opposite ends of a pair of shafts 17 mounted within a vertical drying chamber housing 18. Heated air may be circulated within the chamber housing 18 by any suitable means (not shown).

The molded pulp containers 12 to be dried may be placed on the trays 10 in any convenient manner. By way of example, a horizontally rotatable transfer arm 20 is shown mounted at the bottom of the up course of the conveyor chains 14, for successively transferring the containers 12 thereto from the rotary molding machine as fast as they are produced. The transfer arm 20 is conventional in construction. It may include a contoured suction head 22 for carrying the molded containers 12, and it should rotate in timed relation to the movement of the conveyor chains 14 and the operation of the rotary pulp molding machine.

When the containers 12 are first placed on the drying trays 10 they are still relatively soft and soggy, but they are nearly strong enough to maintain their shape when unsupported by contoured drying forms. The curved rims of molded plates and other containers are considerably more resistant to sagging than are the broad flat areas in the bottom center of such containers. As the containers approach dryness, they become progressively stiffer and stronger. Hence, the dried containers may be removed from the trays without damage at the exit end of the drying chamber merely by allowing them to drop onto an adjacent conveyor belt.

The containers 12 which are deposited on the trays 10 by the transfer arm 20 at the bottom of the up course of the conveyor chains 14 are successively advanced upwardly to the top of the conveyor, which is the midpoint of their path through the drying chamber housing 18, and then the containers are advanced downwardly to the bottom of the down course thereof. Any suitable means may be employed for removing the containers 12 from the trays 10 after they have been dried thereon, for example, they may be allowed to drop onto an endless conveyor belt 24 which transports them to a stacking and packing area.

On the up course of the conveyor chains 14, each of the containers 12 is in an upright position resting on its bottom portion, as shown in Fig. 2, while on the down course of the conveyor each container is in an upside down position supported on the peripheral edges of its top portion, as shown in Fig. 3. As the trays 10 advance around the sprocket 16 at the turning point from the up course to the down course at the top of the conveyor, each of the containers 12 is flopped over onto the tray which had been above it on the up course.

In accordance with the present invention, the trays 10 are designed to prevent undesirable warpage in the molded pulp containers 12 during drying thereof. In particular, the trays 10 prevent the formation of an upward bulge in the bottom center of the containers 12 on the up course of the conveyor chains 14, and the accentuation of this bulge due to the action of gravity during their travel along the down course of the conveyor chains.

In the embodiment of the invention illustrated in Fig. 4, the tray 10 includes a generally rectangular frame 30 having a pair of ears 32 mounted at opposite sides thereof for securing the tray to the pair of conveyor chains 14. A plurality of parallel, laterally spaced slats 34 are secured at their opposite ends to the frame 30. In general, the slats 34 are perfectly straight and they are disposed in the same plane, except in the areas corresponding to the bottom center of four of the molded pulp containers 12 which may be supported thereon, where some of the slats 34 are provided with centrally bent portions 36 forming a gradually curving contour. In one practical embodiment of the invention, the slats 34 were about ¼ inch wide and their centers were about ¾ inch apart.

As viewed in Fig. 2, the bent portions 36 of the slats 34 form a depression which leaves the bottom center of the molded pulp container 12 unsupported on the up course of the conveyor, and this unsupported portion of the container may sag slightly due to its own weight or it may remain perfectly flat. In any event, the amount of sag permitted is sufficient to counteract any tendency to form an upward bulge in this portion of the container on the up course of the conveyor. On the down course thereof, where the container 12 has been inverted and rests on the peripheral edges of its top portion, as viewed in Fig. 3, the bent portions 36 of the slats 34 form an upward bulge which provides needed support for the bottom center of the container. The peripheral edges of the pulp container rest on at least one pair of the perfectly straight slats 34 on both of its sides, and its ends rest on the straight portions of slats having the centrally bent portions 36.

Preferably, the slats 34 are removably mounted in the frame 30, and these slats may be adjustable, so that they may be altered to accommodate different sizes or types of molded pulp containers. It is evident that the trays 10 are still capable of performing their intended function when some of the slats 34 are missing or are purposely removed, provided the remaining slats are properly positioned to support the molded pulp containers thereon. In order to limit the area in which sagging may occur to the bottom center of the container 12, the slats 34 should be positioned to provide support for the container on all of its sides. In the case of a generally rectangular molded pulp container, this means that the support should be provided at both sides as well as at both ends of the container. This is accomplished on both the up course and the down course of the conveyor by providing the centrally bent portions 36 in some of the slats 34 to give the trays 10 the desired contour.

The embodiments of the invention illustrated in Figs. 5, 6 and 7 are particularly suitable for drying very large or very heavy molded pulp containers, which might sag under their own weight to such an extent that they would become unusable. In the embodiment of Fig. 5, a drying tray indicated generally at 38, includes a generally rectangular frame 40 having a pair of ears 42 mounted at opposite sides thereof for securing the tray to a pair of conveyor chains corresponding to the chains 14. A plurality of parallel, laterally spaced slats 44 are secured at their opposite ends to the frame 40. In general, the slats 44 are perfectly straight and they are disposed in the same plane, except in the areas corresponding to the bottom center of two molded pulp containers 45, indicated in phantom lines, which may be supported thereon. In accordance with the invention, it is to be understood that instead of two relatively small molded containers 45, one relatively large container may be supported on the drying tray 38. In these areas every other slat 44 is provided with a centrally bent portion 46 forming a gradually curving contour, and the remaining alternate slats are perfectly straight. The embodiment of Figs. 6 and 7 is similar to that of Fig. 5, but differs in having every other slat 44 provided with a bent portion 48 which is canted sideways into vertical alignment with the adjacent entirely straight slat. This construction provides a substantially flat support on the up course of the conveyor, as shown in Fig. 6, while needed support is provided at the same points on the bottom of the containers 45 by the canting of the bent portions 48 on the down course, as shown in Fig. 7. Thus, any sagging which occurs between the slats on the up course will be compensated on the down course. In both of these embodiments of the invention, the bottom of each container 45 is supported against sagging on both the up and the down courses of the conveyor, thereby affording an effective safeguard against undesirable warpage. In accordance with the invention, it is to be understood that instead of two relatively small molded containers 45, one relatively large container may be supported on the drying tray 38.

Fig. 8 shows a modification applicable to any one of the previously described embodiments, in which an adjustability feature is provided to change the size or the shape of the bulging portion of the trays. A frame 50, corresponding to the frames 30 and 40 of the previously described embodiments, may have a slat 52 removably secured thereto by means of a bolt 54. The slat 52 is provided with a centrally bent portion 56 bulging outwardly. An adjustable sleeve 58 allows changes in the height of the bent portion 56, and another adjustable sleeve 60 permits variations in the length of this portion of the slat 52. Of course, instead of providing adjustable sleeves on relatively rigid slats, the slats may be made from a stiffly pliable metal to enable their contour to be changed without changing their size.

Although the invention has been disclosed in relation to molded pulp products only, it should be understood that apparatus embodying the invention may be employed advantageously for drying or curing other contoured articles, such as molded plastics, and the like.

It will be obvious to those skilled in the art that various changes may be made without departing from the spirit of the invention, and therefore the invention is not limited to what is shown in the drawings and described in the specification, but only as indicated in the appended claims.

What is claimed is:

1. Drying apparatus comprising a vertical chamber, an endless conveyor mounted within the chamber, said conveyor having parallel elongated up and down courses extending between the top and the bottom of the chamber, a plurality of contoured drying trays secured at intervals along the conveyor, means for successively placing contoured articles to be dried onto the trays at the bottom of the up course, which articles become inverted as they advance from the up course to the down course at the top of the chamber, each of said trays having a generally flat surface on one side to support such articles on the up course and having a contoured surface on its opposite side to support the opposite side of such articles in their inverted position on the down course, said surfaces providing support which counteracts upward bulging of the articles on the up course and prevents downward sagging thereof on the down course, and means for successively conveying the dried articles away from the bottom of the down course.

2. A tray for drying molded pulp articles, comprising a generally rectangular frame, a plurality of straight parallel laterally spaced slats removably secured at opposite ends to the frame, and a plurality of parallel laterally spaced slats having centrally bent portions secured at opposite ends to the frame, said slats forming a generally flat supporting surface on one side of the tray and forming an upward bulge in a generally flat supporting surface on the opposite side of the tray.

3. A tray for drying molded pulp articles, comprising a generally rectangular frame, a plurality of straight parallel laterally spaced slats removably secured at opposite ends to the frame, and a plurality of parallel laterally spaced slats having centrally bent portions secured at opposite ends to the frame, said slats forming a generally flat supporting surface having a central depression therein on one side of the tray and forming a generally flat supporting surface having an upward bulge therein on the opposite side of the tray.

4. A tray for drying molded pulp articles, comprising a generally rectangular frame, and a plurality of parallel laterally spaced slats removably secured at opposite ends to the frame, entirely straight slats alternating with centrally bent slats in the area corresponding to the bottom center of an article to be dried supported thereon, said slats forming an entirely flat supporting surface on one side of the tray and forming a gradually curving upward bulge in a generally flat supporting surface on the opposite side of the tray.

5. The tray defined by claim 4 in which the bent portions of the centrally bent slats are canted sideways into vertical alignment with the adjacent entirely straight slats, thereby providing support at corresponding points on the bottom of the pulp articles on opposite sides of the tray.

6. Apparatus for drying molded pulp articles, comprising a vertical chamber, an endless conveyor mounted within the chamber and having parallel elongated up and down courses extending between the top and the bottom of the chamber, a plurality of contoured drying trays secured at intervals along the conveyor, and means for successively placing contoured molded pulp articles to be dried onto the trays at the bottom of the up course, which articles become inverted as they are advanced from the up course to the down course at the top of the chamber, one side of each of said trays having a generally flat surface for supporting said articles on the up course of the conveyor and having a depression in said surface for leaving a portion of the articles unsupported to counteract any upwardly bulging warpage of said portion of the articles during drying thereof, the opposite side of each of said trays having a generally flat surface for supporting the articles in their inverted position on the down course of the conveyor and having an upward bulge in said last-mentioned surface for supporting a portion of the articles to prevent downward sagging thereof.

7. Apparatus for drying molded pulp articles, comprising a vertical chamber, an endless conveyor mounted within the chamber and having parallel elongated up and down courses extending between the top and the bottom of the chamber, a plurality of contoured drying trays secured at intervals along the conveyor, and means for successively placing contoured molded pulp articles to be dried onto the trays at the bottom of the up course, which articles become inverted as they are advanced from the up course to the down course at the top of the chamber, one side of each of said trays having an entirely flat surface for completely supporting the bottom of said articles on the up course of the conveyor, the opposite side of each of said trays having a generally flat surface for supporting the articles in their inverted position on the down course of the conveyor and having an upward bulge in said last-mentioned surface for supporting a contoured portion of the articles to prevent downward sagging thereof.

References Cited in the file of this patent

UNITED STATES PATENTS

| | | |
|---|---|---|
| 1,396,431 | Hirsch | Nov. 8, 1921 |
| 1,525,131 | Hitchcock | Feb. 3, 1925 |
| 1,712,211 | Hanson et al. | May 7, 1929 |
| 2,248,253 | Schachter | July 8, 1941 |
| 2,354,939 | Brock | Aug. 1, 1944 |
| 2,698,076 | Nilsson | Dec. 28, 1954 |